United States Patent

Motoi et al.

[11] Patent Number: 6,010,736
[45] Date of Patent: *Jan. 4, 2000

[54] STEAMED DURUM WHEAT FLOUR

[75] Inventors: Hirofumi Motoi; Kazuhiro Omata; Futoshi Hirasawa; Masaru Kyugo, all of Ohimachi, Japan

[73] Assignee: Nisshin Flour Milling Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/763,434

[22] Filed: Dec. 11, 1996

[30] Foreign Application Priority Data

Dec. 15, 1995 [JP] Japan .................................. 7-347838
Oct. 31, 1996 [JP] Japan .................................. 8-305678

[51] Int. Cl.⁷ .................................................. A21D 6/00
[52] U.S. Cl. .......................... 426/622; 426/94; 426/463; 426/549
[58] Field of Search .................... 426/622, 463, 426/549, 94

[56] References Cited

U.S. PATENT DOCUMENTS 4,294,864  10/1981  Kulp et al. .............................. 426/549
4,882,178  11/1989  Shimanura ............................... 426/27

FOREIGN PATENT DOCUMENTS 58-101634  6/1983  Japan .
62-55048   3/1987  Japan .
62-83858   4/1987  Japan .
3-835567   4/1991  Japan .
4-11857    4/1992  Japan .
6-153769   6/1994  Japan .
6-237682   8/1994  Japan .

*Primary Examiner*—Lien Tran
*Attorney, Agent, or Firm*—Oblon, Spivak, McClelland, Maier & Neustadt, P.C.

[57] ABSTRACT

There is disclosed a steamed durum wheat flour having a gluten vitality of 0.70–0.95 based on that of untreated durum wheat flour and a gluten swelling power of 1.05–1.30 based on that of untreated durum wheat flour. The steamed durum wheat flour is suitable for the manufacture of cakes and doughnuts and for a coating material for fried foods including tempura and fried chicken.

13 Claims, No Drawings

STEAMED DURUM WHEAT FLOUR

FIELD OF THE INVENTION

This invention relates to a steamed durum wheat flour and its application to cakes, doughnuts and fried foods.

BACKGROUND OF THE INVENTION

Typical examples of confectionery made from wheat flour include cakes such as sponge cakes, roll cakes, butter cakes, hotcakes, pancakes, cheese cakes, soufflé cakes, "Kasutera" and doughnuts. Recently, the consumer's demand for a quality of various foods is increasing. For cakes, those have been required which have a large volume when baked, good shape and appearance without any shrinkages, soft and moist texture without any excessive glutinousness, soft eating quality with pleasant mouthfeel and meltaway in the mouth, and good flavor such as sweet smell or palatable taste. For doughnuts, those have been required which have sufficient swelling with large volume when fried, good appearance, good shape and color, good texture and pleasant meltaway in the mouth.

In making cakes, soft wheat flour having less protein content has been conventionally used to obtain soft eating quality with good meltaway in the mouth and no excessive glutinousness. However, the cakes made from soft wheat flour are not satisfactory, because of insufficient volume when baked or fried, poor shape, unsatisfactory moist texture, softness, meltaway in the mouth and flavor.

In such circumstances, various methods have been proposed for making cakes with an improved quality. Japanese Patent Kokai 58-101634 discloses a method in which wheat flour is heated to 83°–92° C. for 4–15 min. in a closed type heater the relative humidity of which is controlled to 90% or more. Japanese Patent Kokai 62-55048 and 62-83858 disclose a process for heating and extruding wheat flour using an extruder with twin screws. Japanese Patent Kokai 6-237682 discloses wheat flour for sponge cakes containing not less than 80% by weight of wheat flour particles with less than 30 μm diameter.

In making doughnuts, soft wheat flour having a less protein content has been conventionally used to obtain a soft eating quality with a good meltaway in the mouth and no excessive glutinousness. However, the doughnuts made from soft wheat flour are not completely satisfactory, because of insufficient volume when fried, poor shape, unsatisfactory moist texture, softness, meltaway in the mouth and flavor.

For fried foods such as tempura, those have been required in which a coating is not sticky or wet, but brittle and not glutinous. For this purpose, soft wheat flour having less protein content has been used for the coating or batter such as tempura. However, those made from soft wheat flour are not satisfactory in that a crispy fried state and brittleness could not be achieved. In particular, the coating for fried foods has become sticky or wet with the lapse of time after frying in oil, with the loss of brittleness or crispness, and if reheated in a microwave oven, the stickiness and poor eating quality could be even more.

In addition, Japanese Patent Kokai 6-153769 discloses that good result can be achieved in making frozen bakery products such as frozen cakes, frozen pies or frozen breads by using grain flour containing durum wheat flour in an amount of not less than 30% by weight.

DETAILED DESCRIPTION OF THE INVENTION

We have made extensive studies in an effort to overcome various problems encountered in the prior art as mentioned above, and found that using as a major wheat flour material a steamed durum wheat flour having a specific "gluten vitality" and a specific "gluten swelling power" can produce cakes which have a large volume when baked, good shape and appearance without any shrinkages, soft and moist texture without any excessive glutinousness, soft eating quality with pleasant mouthfeel and meltaway in the mouth, and good flavor such as sweet smell or palatable taste; doughnuts which have sufficient swelling with large volume when fried, good appearance, good shape and color, good texture, pleasant meltaway in the mouth; and fried foods such as tempura, in which the coating is not sticky and wet, but can be fried in a crispy state, having no glutinousness, brittleness and crispness, such good texture and mouthfeel are maintained even with the lapse of time after frying in oil and even if a fried food after it gets cold is reheated in a microwave oven.

According to the present invention, there is provided a steamed durum wheat flour having a gluten vitality of 0.70–0.95 based on that of untreated durum wheat flour and a gluten swelling power of 1.05–1.30 based on that of untreated durum wheat flour.

The term "gluten vitality" as used herein refers to a ratio of soluble crude protein content (t) to whole crude protein content (t), both the contents being determined for an untreated durum wheat flour and a steamed durum wheat flour according to the determination method which will be mentioned later.

The term "gluten swelling power" as used herein refers to a ratio of the weight of sedimented solid matter (g) to the weight of sample (wheat flour)(g), both the weights being determined for an untreated durum wheat flour and a steamed durum wheat flour according to the determination method which will be mentioned later.

The steamed durum wheat flour and a wheat flour composition containing the same are particularly suitable for the production of confectionery such as cakes and doughnuts and for the coating for fried foods such as tempura and fried chicken.

The "cakes" refer to confectionery having a porous structure which is produced by adding to wheat flour and/or other grain flours as a major material, at least one of eggs, sugars, chemical swelling agents, emulsifiers and the like and then baking or steaming the mixture. Those cakes include sponge cakes, roll cakes, butter cakes, pancakes, hotcakes, cheese cakes, soufflé cakes, "Kasutera" and the like. The "doughnuts" refer to confectionery which is produced by adding to wheat flour and/or other grain flours as a major material, at least one of eggs, sugars, chemical swelling agents, emulsifiers, milks, dairy products and the like and then frying the mixture in oil.

The "fried foods" as referred to herein include tempura, fried chicken, fries, fried cutlets and the like. In particular, the steamed wheat flour of the invention is suitable for coating the material for tempura and fried chicken, etc.

As the wheat flour for confectionery or fried foods, there has been used general purpose grade wheat flour such as soft wheat flour, which is produced by milling wheat having 6 pairs of genomes and belonging to the "common wheat" in botanical classification. Representative example of such common wheat includes soft wheat flour with less protein content such as Western White Wheat grown in U.S.A. or Soft grown in Australia.

On the other hand, the durum wheat flour as used herein is different from the aforesaid common wheat in that it belongs to the "two grains wheat" having 4 pairs of genomes in botanical classification. The durum wheat is produced chiefly in the areas centering in the State of North Dakota in U.S.A. as well as the States of Montana and South Dakota in U.S.A. and also in other countries than U.S.A., which is hard wheat with a higher protein content, containing at least 60% glassy kernel and having an average protein content of more than 14%. Such durum wheat has been mainly used in the form of semolina, in particular, for the production of spaghetti or macaroni which requires a hard and elastic mouthfeel.

As stated above, it should be required in the invention that a gluten vitality of the steamed durum wheat flour be 0.70–0.95, preferably 0.80–0.90, based on that of untreated durum wheat flour.

If the gluten vitality of the steamed durum wheat flour is less than 0.70 or more than 0.95, the cakes made therefrom have the drawbacks of less increased volume, insufficient softness, poor meltaway and poor color with a darkened baked color, and the doughnuts made therefrom have an insufficient volume, poor color and shape, higher glutinousness, and poor meltaway. If the fried food such as tempura is made from the steamed durum wheat flour having the gluten vitality of less than 0.70 or more than 0.95, the coating for fried food becomes sticky and wet, has higher glutinousness and loses a brittle and crispy mouthfeel, especially with the lapse of time after frying in oil and, if reheated in a microwave oven after it gets cold with the lapse of time after frying in oil, such a poor state will be far more promoted.

In addition, it should be required in the invention that a "gluten swelling power" of the steamed durum wheat flour be 1.05–1.30, preferably 1.06–1.20, based on that of untreated durum wheat flour.

If the gluten swelling power of the steamed durum wheat flour is less than 1.05 or more than 1.30, the cakes made therefrom have less increased volume, poor shape with shrinkages and strongly glutinous and poor mouthfeel, and the doughnuts made therefrom have insufficient volume, poor color and shape, higher glutinousness, poor texture and poor meltaway. If the fried food such as tempura is made from the steamed durum wheat flour having the gluten swelling power of less than 1.05 or more than 1.30, the coating for fried food becomes sticky and wet, has higher glutinousness and loses brittle and crispy mouthfeel, especially with the lapse of time after frying in oil and, if reheated in a microwave oven after it gets cold with the lapse of time after frying in oil, such a poor state will be far more promoted.

The "gluten vitality" and "gluten swelling power" as referred to herein are determined in the following manner.

I. Determination of gluten vitality (1) Determination of soluble crude protein content of wheat flour:

(a) 2 g of a sample (wheat flour) were precisely weighed into a 100 ml volume beaker.

(b) 40 ml of 0.05N acetic acid were added to the beaker and stirred at room temperature for 60 min. to prepare a suspension.

(c) The suspension was placed into a centrifuge tube and centrifuged at 5000 rpm for 5 min. and then filtered with a filter paper to recover the filtrate.

(d) The beaker as used above was washed with 40 ml of 0.05N acetic acid, the washings were placed into a centrifuge tube and centrifuged at 5000 rpm for 5 min. and then filtered with a filter paper to recover the filtrate.

(e) The filtrates recovered in the above steps (c) and (d) were combined to make up to 100 ml.

(f) 25 ml of the liquid prepared in the above step (e) were placed into a Kjeldahl tube in the Kjeltec Autosystem manufactured by Tecator Co., Ltd. (Sweden) using a whole pipette, and then one tablet of the decomposition-promoting agent ("KELTAB C" manufactured by Nihon General Co., Ltd; potassium sulfate:copper sulfate=9:1 (by weight)) and 15 ml of conc. sulfuric acid were added.

(g) Using Kjeltec decomposition furnace (DIGESTION SYSTEM 20 1015 type) incorporated in the above Kjeltec Autosystem, decomposition was carried out with dial 4 for one hour and then automatized with dial 9 or 10 for one hour. Following the decomposition, the decomposed liquid was continuously and automatically distilled and titrated using the Kjeltec Distillation and Titration System (KJELTEC AUTO 1030 type) incorporated in the same Kjeltec Autosystem (using 0.1N sulfuric acid for titration), and a soluble crude protein content of the sample (wheat flour) was calculated according to the following equation.

$$\text{Soluble crude protein content } (\%) = 0.14 \times (T-B) \times F \times N \times (100/S) \times (1/25)$$

in which

T=Amount of 0.1N sulfuric acid required for titration (ml)

B=Amount of 0.1N sulfuric acid required for blank titration (ml)

F=Titer of 0.1N sulfuric acid used for titration (as determined on use or a commercially available product with titer indication may be used.)

N=Conversion factor for nitrogen protein (5.70)

S=Weighed amount of sample (g)

(2) Determination of whole crude protein content of wheat flour:

(a) 0.5 g of a sample (wheat flour) was precisely weighed into the same Kjeldahl tube in the Kjeltec Autosystem manufactured by Tecator Co., Ltd. (Sweden) as used in the above (1) and one tablet of the same decomposition-promoting agent as used in the above step (f) and 5 ml of conc. sulfuric acid were added.

(b) Using the same Kjeltec decomposition furnace in the Kjeltec Autosystem as used in the above (1), automatic decomposition was carried out with dial 9 or 10 for one hour. Following the decomposition, the decomposed liquid was continuously and automatically distilled and titrated using the same Distillation and Titration System as used in the above (1) (using 0.1N sulfuric acid for titration), and whole crude protein content of the same (wheat flour) was calculated according to the following equation.

$$\text{Whole crude protein content } (\%) = (0.14 \times T \times F \times N)/S$$

in which

T=Amount of 0.1N sulfuric acid required for titration (ml)

F=Titer of 0.1N sulfuric acid used for titration (as determined on use)

N=Conversion factor for nitrogen protein (5.70)

S=Weighed amount of sample (g)

(3) Calculation of gluten vitality:

The gluten vitality of the sample (wheat flour) was calculated from the soluble crude protein content of the sample (wheat flour) determined in the above (1) and the whole crude protein content of the sample (wheat flour) determined in the above (2) according to the following equation.

Gluten vitality (%) =

(Soluble crude protein content/Whole crude protein content) × 100

II. Determination of gluten swelling power (a) 10 g of a sample (wheat flour) were precisely weighed into a 300 ml volume beaker.

(b) 200 ml of 0.02N lactic acid were added to the above beaker, stirred and allowed to stand overnight.

(c) The suspension prepared in the above step (b) was centrifuged at 3000 rpm for 3 min., and then the supernatant was discarded by decantation. The tube was allowed to stand upside down for one minute to remove the supernatant completely and then reversed. A weight (g) of the solid matter sedimented at the bottom of the tube was measured and the gluten swelling power was calculated according to the following equation.

Gluten swelling power=$W_1/W_0$ in which $W_0$=Weight of sample (wheat flour) (g)

$W_1$=Weight of sedimented solid matter (g)

The steamed durum wheat flour of the invention has preferably an average particle size of not more than 150 μm, more preferably not more than 120 μm. When the steamed durum wheat flour having the above-defined average particle size is used, confectionery such as cakes or doughnuts are finely and uniformly aerated, and the coating for the fried foods is not coarse, but pleasant to the tongue.

In general, durum wheat flours as produced by the flour milling process have an average particle size of at least 200 μm, which can be milled into the average particle size of not more than 150 μm desired for the present invention by means of any suitable milling means. The milling means and procedures are not particularly limited, but milling may be carried out by means of a roll mill or a pin mill. Milling of the durum wheat flour into the average particle size of not more than 150 μm may be carried out either before or after the steaming treatment.

It should be noted that the steamed durum wheat flour of the present invention includes all those having the gluten vitality of 0.70–0.95 and the gluten swelling power of 1.05–1.30, with no depending on the processes for the preparation thereof.

The steamed durum wheat flour of the present invention can be produced by subjecting durum wheat flour to steam treatment under heat in the presence of water vapor. The conditions for steam treatment can be decided so as to provide durum wheat flour with the desired gluten vitality and the desired gluten swelling power. The residence time of durum wheat flour in the heating apparatus is decided depending on the temperature of steamed durum wheat flour discharged from the heating apparatus, which is called hereafter "product temperature". For instance, the product temperature of 75°–95° C. requires the residence time of 2–20 sec.

In the practice of the present invention, there can be employed various types of heating apparatus industrially used in the steam treatment of wheat flour, which can include a closed type heating apparatus into which saturated steam is introduced, e.g. the apparatus equipped with an agitator. For the present invention, the temperature of saturated steam at 100°–130° C. is suitable.

In a preferred embodiment of the present invention, the steamed durum wheat flour can be conveniently produced with a high productivity, by a process wherein durum wheat flour is charged into a closed apparatus equipped with an agitator into which saturated steam at 100°–130° C. has been introduced, and steamed while allowing to dwell therein for the residence time of 2–20 sec., so that the temperature of steamed durum wheat flour discharged from the apparatus ranges from 75° to 95° C.

In a more preferred embodiment of the invention, as the above-described closed apparatus with an agitator can be employed the apparatus for sterilising granular material disclosed in Japanese Patent Kokai 3-83567 which comprises a cylindrical pressure vessel having saturated steam blow in hole and an agitator having rod-like blades positioned spirally on its rotary shaft. In that case, the steam treatment is performed under the above-mentioned conditions, by setting the peripheral speed at the tip of the rod-like blade at 5–20 m/sec.

In case where the steamed durum wheat flour of the invention is used for making confectionery such as cakes and doughnuts and for the coating of fried foods, it is preferable to use the steamed durum wheat flour in combination with other grain flours (e.g., soft wheat flour) in order to produce the confectionery and fried foods of a better quality.

In particular, a wheat flour composition for cakes (i.e. cake mix) comprising 20–80% by weight of the steamed durum wheat flour and 80–20% by weight of soft wheat flour can produce the cakes which have a large volume and no shrinkage when baked, and have a good baked color, good shape and appearance, as well as a soft and moist texture, an eating quality of soft mouthfeel and meltaway and a good taste with sweet flavor. For more improved quality, it is particularly preferable to use the wheat flour composition for cakes, which comprises 40–60% by weight of the steamed durum wheat flour and 60–40% by weight of soft wheat flour.

A wheat flour composition for doughnuts (i.e. doughnut mix) comprising 20–80% by weight of the steamed durum wheat flour and 80–20% by weight of soft wheat flour can produce the doughnuts which have a large volume when fried in oil, and have a good color, good shape and appearance, as well as good texture, and good meltaway and eating quality. For more improved quality, it is particularly preferable to use the wheat flour composition for doughnuts, comprising 30–70% by weight of the steamed durum wheat flour and 70–30% by weight of soft wheat flour.

A wheat flour composition comprising 20–80% by weight of the steamed durum wheat flour and 80–20% by weight of soft wheat flour for the coating material can produce the fried foods with a high quality, which have a crispy coating with brittleness, while such a good quality, is maintained even when the fried food gets cold with the lapse of time after frying in oil and also when the cold fried food is reheated in a microwave oven. For more improved quality, it is particularly preferable to use the wheat flour composition for fried foods comprising 30–70% by weight of the steamed durum wheat flour and 70–30% by weight of soft wheat flour.

The wheat flour compositions for cakes (cake mix), doughnuts (doughnut mix) and fried foods as stated above may contain at least one of other grain flours such as strong wheat flour, barley flour, rye flour, buckwheat flour, rice flour, adzuki bean flour, soy bean flour etc.; additives for cake mix, doughnut mix or fried coating, e.g., common salt, baking powder, sugar, honey, malt syrup or other saccharides; milk, skim milk powder, condensed milk or other dairy products; shortening, butter, margarine, lard, vegetable oils or other animal and vegetable oils and fats; egg or egg products; spices; moisture holding agents such as gums; emulsifying agents; protein processing agents such as vital gluten; nutrient enriching agents such as vitamins, minerals or amino acids; preservatives and the like.

Cakes can be made by blending the steamed durum wheat flour or the cake mix, optionally with other grain flours and various additives conventionally used for the manufacture of cakes as mentioned above to form a cake batter in a conventional manner and then baking or steaming it.

Doughnuts can be made by blending the steamed durum wheat flour or the doughnut mix, optionally with other grain flours and various additives conventionally used for the manufacture of doughnuts as stated above to prepare a doughnut dough in a conventional manner, forming said dough into suitable size and shape by punching or blanking and then frying it in oil.

Fried foods can be made by blending the steamed durum wheat flour or a mixture of the steamed durum wheat flour and soft wheat flour at a weight ratio of 20:80–80:20, optionally with other grain flours or various additives conventionally used for the coating, e.g., common salt, baking powder or starches to prepare a coating liquid, applying said coating liquid to suitable food materials such as vegetables, fishes and shellfishes or meats and then frying them in oil.

The invention is illustrated by the following examples.

EXAMPLE 1

Production of steamed durum wheat flour

Into a closed apparatus equipped with a high speed agitator having rod-like blades disclosed in Japanese Patent Kokai 3-83567 manufactured by Nisshin Engineering Co., Ltd. which had been pressurized to 1.2 kg force/cm$^2$ by blowing saturated steam at 110° C. at a rate of 12 kg/hr was charged durum wheat flour having an average particle size of 270 μm, gluten vitality of 47.7% and gluten swelling power of 1.8 at a rate of 200 kg/hr. Steaming treatment was performed under the conditions of setting the peripheral speed at the tip of the rod-like blade at 5.5 m/sec and allowing the durum wheat flour to dwell in the closed apparatus for a residence time of 20 sec. to prepare the steamed durum wheat flour for cakes. In that case, the temperature of the steamed durum wheat flour was 80° C. at the discharge port of the closed apparatus. The steamed durum wheat flour was milled with a pin mill manufactured by Alpine Co., Ltd. at a rotary speed of 15,000 rpm to make the flour with an average particle size of 95 μm.

The steamed durum wheat flour after milling was determined for the gluten vitality and gluten swelling power according to the above methods, with the results of 44.2% and 1.9, respectively, as shown in Table 1. These numerical values were converted into the gluten vitality of 0.926 and gluten swelling power of 1.06, respectively, on the basis of that of untreated durum wheat flour.

EXAMPLES 2–5 AND COMPARATIVE EXAMPLES 1–2

Production of steamed durum wheat flour

Steaming treatment was carried out by using the same durum wheat flour and closed apparatus as used in Example 1 under the conditions shown in Table 1 and then pin milling was performed in the same manner as in Example 1 to produce the steamed durum wheat flours having an average particle size of 95 μm.

The steamed durum wheat flours after milling were determined for the gluten vitality and gluten swelling power, respectively, which are summarized in the following Table 1.

TABLE 1

|  | Control | Comparative Example 1 | Example 1 | Example 2 | Example 3 | Comparative Example 2 | Example 4 | Example 5 |
|---|---|---|---|---|---|---|---|---|
| Steaming condition | | | | | | | | |
| Wheat flour feed[1] (kg/h) | — | 200 | 200 | 200 | 200 | 200 | 200 | 200 |
| Saturated steam feed (kg/h) | — | 10 | 12 | 14 | 18 | 20 | 20 | 20 |
| Peripheral speed of rod-like blade (m/s) | — | 5.5 | 5.5 | 5.5 | 5.5 | 5.5 | 5.5 | 5.5 |
| Residence time (sec.) | — | 20 | 20 | 20 | 20 | 20 | 2 | 8 |
| Wheat flour temp.[2] (° C.) | — | 70 | 80 | 90 | 95 | 100 | 80 | 90 |
| Properties of steamed wheat flour | | | | | | | | |
| Gluten vitality (%) | 47.7 | 47.5 | 44.2 | 40.3 | 34.5 | 33.1 | 44.1 | 40.5 |
| (Ratio to Control) | (1) | (0.996) | (0.926) | (0.845) | (0.725) | (0.694) | (0.925) | (0.849) |
| Gluten swelling power | 1.8 | 1.9 | 1.9 | 2.0 | 2.2 | 2.4 | 1.9 | 2.0 |
| (Ratio to Control) | (1) | (1.06) | (1.06) | (1.11) | (1.22) | (1.33) | (1.06) | (1.11) |

[1]Amount of durum wheat flour fed to the closed apparatus
[2]Temperature of steamed durum wheat flour at the discharge port of the closed apparatus

APPLICATION EXAMPLES 1–6

Production of sponge cakes

Each wheat flour composition for cakes (each cake mix) was prepared by blending 60 parts by weight of each of the steamed durum wheat flours prepared in Examples 1–3, the steamed durum wheat flours prepared in Comparative Examples 1–2 and durum wheat flour before steaming treatment (control), 40 parts by weight of soft wheat flour ("VIOLET" manufactured by Nisshin Flour Milling Co., Ltd.), 120 parts by weight of sugar, 2 parts by weight of a baking powder and 20 parts by weight of an emulsifying agent. All of the durum wheat flours used had been milled to the average particle size of 95 μm.

To 400 g of each cake mix as prepared above were added 330 g of raw egg and 40 g of water and the mixture was whipped sufficiently by means of Hobert mixer at low speed for one min., at medium speed for 4 min. 280 g of the whipped batter were poured into a cake mold No. 5 and baked in a rotary oven at 180° C. for 35 min. to make a sponge cake.

The sponge cake was measured for its volume according to a rapeseed displacement method and each volume was shown in the following Table 3. Further, the sponge cake produced in each Example was scored for its shape, color, texture and eating quality and flavor by 10 panellists according to the ratings as defined in the following Table 2 and the averaged score is also shown in Table 3.

TABLE 2

Rating standard for quality of sponge cake

Shape:

5: Completely flat surface, no shrinkage observed at all
4: Flat surface, no shrinkage observed
3: Slight shrinkage observed on surface, but substantially flat
2: Shrinkage observed on surface, somewhat lacking in flatness
1: Very large shrinkage observed on surface, poor shape Baked Color:

5: Very bright, very good
4: Bright, good
3: Average
2: Slightly dark brown, somewhat poor
1: Very dark brown, poor Texture:

5: Very soft, moist and good texture
4: Soft and substantially moist texture
3: Slightly soft, somewhat moist texture
2: Slightly hard, slightly dry and crumbling texture
1: Hard, dry and crumbling and poor texture Eating quality:

5: Soft mouthfeel, very good meltaway
4: Slightly soft mouthfeel, good meltaway
3: Slightly sticky, slightly inferior meltaway
2: Sticky, poor meltaway
1: Very sticky, very poor meltaway Flavor:

5: Sweet and good smell, good taste
4: Sweet smell, substantially good tate
3: Slightly sweet smell, slight taste

TABLE 2-continued

Rating standard for quality of sponge cake

2: Less sweet smell, little taste
1: No sweet smell, no taste

TABLE 3

| Application Example: | Type | Durum Wheat Flour Gluten Vitality[1] | Gluten Swelling Power[2] | Flour composition[3] (weight ratio) | Quality of sponge cake Volume (ml) | Shape | Baked color | Texture | Eating quality | Flavor |
|---|---|---|---|---|---|---|---|---|---|---|
| 1 | Example 1 | 0.926 | 1.06 | 60/40 | 1130 | 4.7 | 4.2 | 4.5 | 4.6 | 4.6 |
| 2 | Example 2 | 0.845 | 1.11 | 60/40 | 1140 | 4.8 | 4.3 | 4.7 | 4.8 | 4.8 |
| 3 | Example 3 | 0.725 | 1.22 | 60/40 | 1100 | 4.4 | 4.0 | 4.5 | 4.7 | 4.8 |
| 4 | Control | 0.100 | 1.00 | 60/40 | 1080 | 2.8 | 3.8 | 3.2 | 2.1 | 4.0 |
| 5 | Comparative Example 1 | 0.996 | 1.06 | 60/40 | 1030 | 3.2 | 4.0 | 3.0 | 2.6 | 4.2 |
| 6 | Comparative Example 2 | 0.694 | 1.33 | 60/40 | 1050 | 3.4 | 2.5 | 3.0 | 2.5 | 4.2 |

[1]Gluten vitality on the basis of that of untreated durum wheat flour
[2]Gluten swelling power on the basis of that of untreated durum wheat flour
[3]Weight ratio of durum wheat flour/soft wheat flour in the wheat flour composition upon the manufacture of a sponge cake It is apparent from the results of Tables 1 and 3 that sponge cakes produced in Application Examples 1–3 using the steamed durum wheat flours of Examples 1–3 having a gluten vitality of 0.8–0.95 and a gluten swelling power of 1.05–1.30 based on those of untreated durum wheat flour (control) have much more improved qualities including a larger volume, no shrinkage on surface, a better shape, a better baked color, a soft, moist and better texture, an eating quality of soft mouthfeel and better meltaway, a sweet smell and a better palatable taste, as compared with the sponge cake produced in Application Example 4 using the untreated durum wheat flour (control) and the sponge cake produced in Application Example 5 using the durum wheat flour of Comparative Example 1 having the gluten vitality and gluten swelling power out of the scope of the present invention due to an excessively low level of steaming treatment.

On the other hand, it is found that the sponge cake produced in Application Example 6 using the steamed durum wheat flour of Comparative Example 2 having the gluten vitality and gluten swelling power out of the scope of the present invention due to an excessively high level of steaming treatment, has a poor quality including a dark brown baked color and a poor meltaway.

APPLICATION EXAMPLES 7–11

Production of sponge cakes

Sponge cakes were made in the same manner as in Application Examples 1–6 except that a blending ratio of the steamed durum wheat flour prepared in Example 1 to the soft wheat flour used in Application Examples 1–6 was changed as indicated in the following Table 4.

The sponge cakes thus made were measured for their volume and rated for their quality in the same manner as in Application Examples 1–6, with the results shown in the following Table 4.

Alternatively, sponge cakes were made in the same manner as described above except that the steamed durum wheat flour obtained in the same manner as in Example 1 was used in the unmilled form (an average particle size of 270 μm).

The sponge cakes were measured for their volume and rated for their quality, with the results shown in the following Table 4.

Ltd.). The quality was evaluated by 10 panellists according to the ratings as defined in the following Table 5 and the averaged score is shown in Table 6.

TABLE 4

| Application Example: | Composition of wheat flour for sponge cakes | Volume (ml) | Quality of sponge cake | | | | |
|---|---|---|---|---|---|---|---|
| | | | Shape | Baked color | Texture | Eating quality | Flavor |
| 7 | Soft wheat flour 100% | 1000 | 2.2 | 2.6 | 2.8 | 1.2 | 2.7 |
| 8 | Soft wheat flour 80%:Steamed drum wheat flour 20% | 1130 | 4.2 | 3.5 | 4.2 | 3.2 | 4.2 |
| 9 | Soft wheat flour 60%:Steamed drum wheat flour 40% | 1130 | 4.8 | 4.2 | 4.8 | 4.3 | 4.7 |
| 10 | Soft wheat flour 40%:Steamed drum wheat flour 60% | 1110 | 4.6 | 4.3 | 4.3 | 4.5 | 4.8 |
| 11 | Soft wheat flour 20%:Steamed drum wheat flour 80% | 1110 | 3.4 | 4.2 | 4.2 | 3.2 | 4.8 |

It is apparent from the results of Table 4 that sponge cakes produced in Application Examples 8–11 using the grain flour which are a blend of the steamed durum wheat flour of the present invention and the soft wheat flour at a weight ratio of 20:80–80:20 have more improved quality including a larger volume, no shrinkage on surface, a better shape, a better baked color, a soft moist and better texture, an eating quality of soft mouthfeel and better meltaway, and a sweet smell and a better palatable taste.

APPLICATION EXAMPLE 12

Production of doughnuts

A wheat flour composition for doughnuts (doughnut mix) was prepared by blending 30 parts by weight of the steamed durum wheat flour prepared in Example 1, 70 parts by weight of soft wheat flour ("FLOWER" manufactured by Nisshin Flour Milling Co., Ltd.), 40 parts by weight of sugar, 10 parts by weight of a shortening, 1 part by weight of a baking powder, and 2 parts by weight of an emulsifying agent.

A dough was prepared by mixing 1000 g of the doughnut mix prepared as above with 430 g of water. The dough was rolled into a sheet, punched into a ring form and fried in oil at 180° C. to make doughnuts.

The doughnuts produced as above were scored for its appearance and eating quality (texture and meltaway) by 10 panellists according to the ratings as defined in the following Table 5 and the averaged score is shown in Table 6.

APPLICATION EXAMPLE 13

Production of doughnuts

Doughnuts were prepared in the same manner as in Application Example 12 except that 30 parts by weight of untreated durum wheat flour (milled into an average particle size of 95 μm) were used instead of 30 parts by weight of the steamed durum wheat flour prepared in Example 1. The quality was evaluated by 10 panellists according to the ratings as defined in the following Table 5 and the averaged score is shown in Table 6.

APPLICATION EXAMPLE 14

Production of doughnuts

Doughnuts were prepared in the same manner as in Application Example 12 except that 100 parts by weight of soft wheat flour ("FLOWER" manufactured by Nisshin Flour Milling Co., Ltd.) was used instead of 30 parts by weight of the steamed durum wheat flour prepared in Example 1 and 70 parts by weight of soft wheat flour ("FLOWER" manufactured by Nisshin Flour Milling Co.,

TABLE 5

Rating standard for quality of doughnuts

Appearance:

5: Sufficiently swollen, large volume, good color and shape, very good appearance
4: Considerably well swollen, large volume, good color and shape, good appearance
3: Average
2: Slightly small volume, slightly poor color and shape, poor appearance
1: Small volume, poor color and shape, very poor appearance Texture:

5: Soft, very good texture
4: Slightly soft, good texture
3: Slightly sticky, slightly poor texture
2: Sticky, considerably poor texture
1: Very sticky, poor texture Meltaway:

5: Very good meltaway
4: Considerably good meltaway
3: Slightly good meltaway
2: Slightly poor meltaway
1: Poor meltaway

TABLE 6

| | Eating quality | | |
|---|---|---|---|
| | Appearance | Texture | Meltaway |
| Application Example 12 (Inventive) | 4.7 | 4.6 | 4.5 |
| Application Example 13 (Comparative) | 3.5 | 3.3 | 3.1 |
| Application Example 14 (Comparative) | 3.5 | 2.8 | 2.6 |

It is apparent from the results of Tables 5 and 6 that the doughnuts produced in Application Example 12 using the grain flours which are a blend of the steamed durum wheat flours of the present invention and soft wheat flour have a far more improved quality including sufficient swelling, better color and shape, better appearance, and better eating quality with softness, and better meltaway, as compared with the doughnuts produced in Application Examples 13 and 14 with no use of the steamed durum wheat flour of the present invention.

APPLICATION EXAMPLE 15

Production of tempura

A coating liquid was prepared by blending and stirring 40 parts by weight of the steamed durum wheat flour prepared in Example 1, 60 parts by weight of soft wheat flour ("VIOLET" manufactured by Nisshin Flour Milling Co., Ltd.), 2 parts by weight of a baking powder and 170 parts by weight of water. The coating liquid was applied to round slices of sweet potato with a thickness of 1 cm. The slices were fried in oil at 180° C. for 3 min. to make sweet potato tempura.

The sweet potato tempura was scored for texture in the coating and eating quality by 10 panellists according to the rating standard as defined in the following Table 7 immediately after frying, at 3 hours after frying and at the time when the tempura getting cool after 3 hours from frying was reheated in a microwave oven (output, 600 W) for 30 sec. The averaged scores are shown in the following Table 8.

APPLICATION EXAMPLE 16

Production of tempura

Sweet potato tempura was prepared in the same manner as in Application Example 15 except that 40 parts by weight of the unsteamed durum wheat flour (milled into an average particle size of 95 μm) was used instead of 40 parts by weight of the steamed durum wheat flour prepared in Example 1. The quality was scored by 10 panellists in the same manner as in Application Example 15. The averaged scores are shown in the following Table 8.

APPLICATION EXAMPLE 17

Production of tempura

Sweet potato tempura was prepared in the same manner as in Application Example 15 except that 100 parts by weight of soft wheat flour ("VIOLET" manufactured by Nisshin Flour Milling Co., Ltd.) were used instead of 40 parts by weight of the steamed durum wheat flour prepared in Example 1 and 60 parts by weight of soft wheat flour ("VIOLET" manufactured by Nisshin Flour Milling Co., Ltd.). The quality was scored by 10 panellists in the same manner as in Application Example 15. The averaged scores are shown in the following Table 8.

TABLE 7

Rating standard for quality of tempura

Texture of coating:

5: Completely crispy, dry texture
4: Crispy, considerably dry texture
3: Slightly moist state
2: Considerably moist state

TABLE 7-continued

Rating standard for quality of tempura

1: Very sticky, highly moist state
Eating quality of coating:

5: Completely brittle, very good eating quality
4: Brittle, good eating quality
3: Slightly sticky, insufficient brittleness
2: Sticky, considerably poor eating quality
1: Highly sticky, very poor eating quality

TABLE 8

| | Texture | | | Eating quality | | |
|---|---|---|---|---|---|---|
| | Immediately after frying in oil | After 3 hrs. lapsed | Reheated in microwave oven | Immediately after frying in oil | After 3 hrs. lapsed | Reheated in microwave oven |
| Application Example 15 (Inventive) | 4.7 | 4.3 | 4.3 | 4.6 | 4.0 | 4.0 |
| Application Example 16 (Comparative) | 4.6 | 3.1 | 2.4 | 4.5 | 3.0 | 1.5 |
| Application Example 17 (Comparative) | 4.7 | 2.3 | 1.2 | 4.6 | 1.8 | 1.2 |

It is apparent from the results of Table 8, that tempura prepared in Application Example 15 using as a coating material the grain flours which are a blend of the steamed durum wheat flours of the present invention and soft wheat flour has crispy, very good eating quality and a brittle and good texture, and that such good texture and eating quality remain unchanged after 3 hours from frying in oil and when the tempura after getting cold was reheated in a microwave oven.

On the other hand, it is found that tempura prepared in Application Examples 16 and 17 using the grain flours not containing the steamed durum wheat flour of the present invention as a coating material has a moist and poor texture in 3 hours after frying in oil and that when the tempura after getting cold was reheated in a microwave oven, the texture and eating quality of the coating were getting worse.

What is claimed is:

1. A steamed durum wheat flour having a gluten vitality of 0.80–0.90 based on that of untreated durum wheat flour and a gluten swelling power of 1.06–1.20 based on that of untreated durum wheat flour, which is obtainable by a process wherein durum wheat flour is charged into a closed apparatus into which saturated steam at 100°–130° C. has been introduced, and then steamed while allowing to dwell therein for a residence time of 2–20 seconds.

2. The steamed durum wheat flour of claim 1 for use in the manufacture of cakes and doughnuts.

3. The steamed durum wheat flour of claim 1 for use in a coating material for fried foods including tempura and fried chicken.

4. A wheat flour composition comprising 20–80% by weight of steamed durum wheat flour according to claim 1 and 80–20% by weight of soft wheat flour.

5. The wheat flour composition of claim 4 for use in the manufacture of cakes.

6. The wheat flour composition of claim 5 wherein steamed durum wheat flour comprises 40–60% by weight and soft wheat flour comprises 60–40% by weight.

7. The wheat flour composition of claim 4 for use in the manufacture of doughnuts.

8. The wheat flour composition of claim 7 wherein steamed durum wheat flour comprises 30–70% by weight and soft wheat flour comprises 70–30% by weight.

9. The wheat flour composition of claim 4 for a coating material for fried foods.

10. The wheat flour composition of claim 9 wherein steamed durum wheat flour comprises 30–70% by weight and soft wheat flour comprises 70–30% by weight.

11. A cake produced from the steamed durum wheat flour of claim 1 or the wheat flour composition of claim 5 or 6, optionally with other grain flours and various additives conventionally used for the manufacture of cakes.

12. A doughnut produced from the steamed durum wheat flour of claim 1 or the wheat flour composition of claim 7 or 8, optionally with other grain flours and various additives conventionally used for the manufacture of doughnuts.

13. A fried food produced from the steamed durum wheat flour of claim 1 or the wheat flour composition of claim 9 or 10, optionally with other grain flours and various additives conventionally used for the coating for fried foods.

* * * * *